June 21, 1955 C. E. DE LANCEY 2,711,177
SMOKER'S PIPE
Filed Sept. 22, 1952
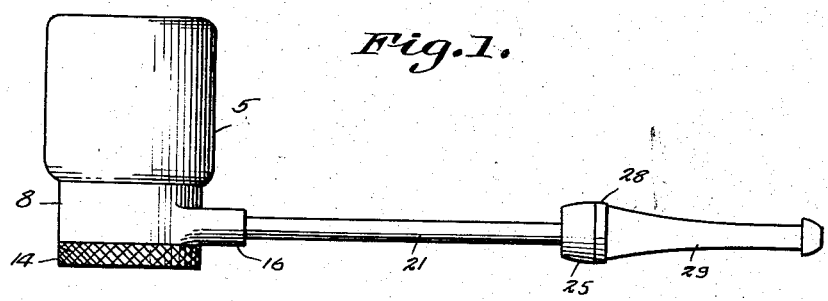
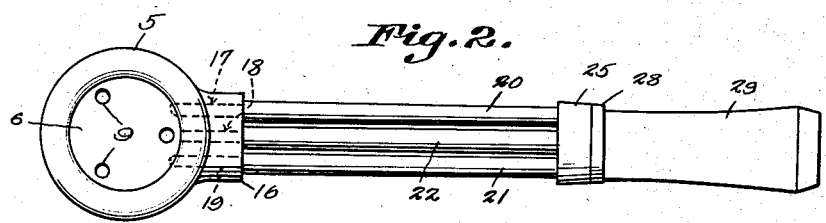
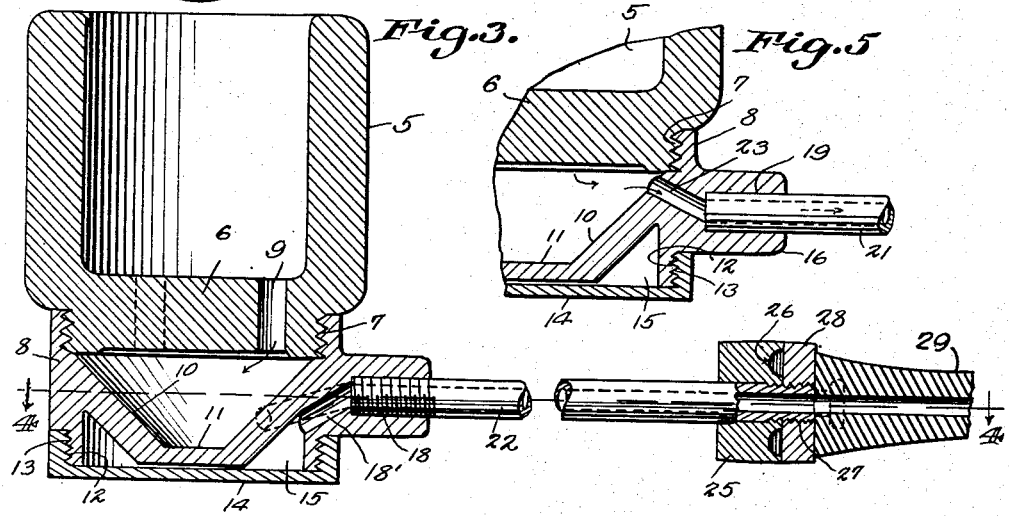
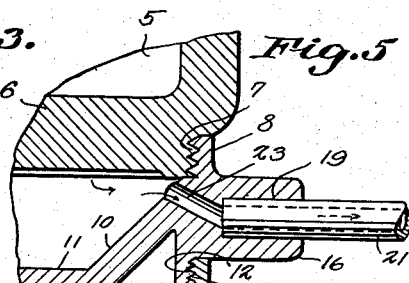
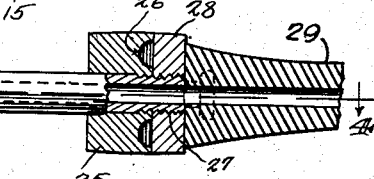
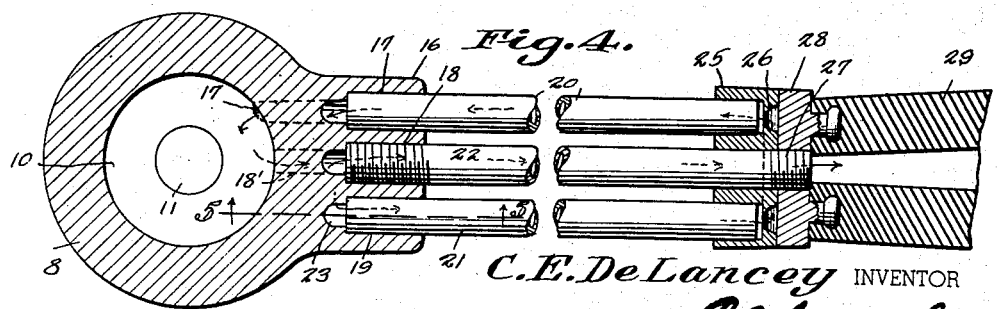
C. E. DeLancey INVENTOR
BY CA Snow &Co.
ATTORNEYS.

United States Patent Office 2,711,177
Patented June 21, 1955

2,711,177

SMOKER'S PIPE

Charles E. De Lancey, New Bloomfield, Pa.

Application September 22, 1952, Serial No. 310,807

3 Claims. (Cl. 131—194)

This invention relates to a tobacco smoking pipe, the primary object of the invention being to provide a smoking pipe which is so constructed that the smoke when leaving the bowl of the pipe will not only be filtered, but will take such an irregular course in passing to the mouthpiece of the pipe, that the smoke will be cooled upon reaching the mouth of the smoker, insuring a cool sweet smoke, thereby increasing the pleasure derived from smoking the pipe.

An important object of the invention is to provide a pipe bowl including removable upper and lower metallic moisture traps into which moisture and saliva are trapped, to insure against the moisture and saliva being drawn into the mouth of the smoker while smoking.

Still another object of the invention is to provide a smoking pipe wherein the bowl and trap sections thereof may be readily disassembled to facilitate the cleaning of the pipe.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing,

Figure 1 is a side elevational view of a smoking pipe, constructed in accordance with the invention.

Fig. 2 is a plan view thereof.

Fig. 3 is a longitudinal enlarged sectional view through the pipe, with parts broken away.

Fig. 4 is a sectional view taken on line 4—4 of Fig. 3.

Fig. 5 is a fragmental sectional view taken on line 5—5 of Fig. 4.

Referring to the drawing in detail, the pipe comprises the bowl 5 which may be constructed of any suitable material, such as briarwood, meerschaum or the like, commonly used in the manufacture of pipe bowls.

The bowl 5 is so shaped that an exceptionally thick bottom 6 is provided, a portion of the bottom being cut away and threaded at 7, to cooperate with the threads of the upper trap section 8, which forms a part of the pipe. The bottom 6 is formed with a plurality of bores 9 preferably arranged equidistantly apart, and through which smoke passes in entering the upper trap section 8.

The upper trap section 8 is formed with inclined walls 10 which are inclined inwardly towards the bottom 11 so that moisture entering the trap section 8 from the bowl 5 will gravitate to the bottom of the trap section.

The trap section 8 is formed with external threads 12 that cooperate with the internal threads 13 of the lower trap section 14, the lower trap section being of a construction so that when it is positioned as shown by Fig. 3 of the drawing, the lower surface of the bottom 11 will be slightly spaced from the bottom of the lower trap section 14, dividing the lower trap section into an annular passage 15, for the passage of smoke, the passage 15 also acting as a trap for moisture which may enter the lower trap section 14 from the tube 20 and also for saliva from the tube 22 and mouthpiece 29.

The upper trap section 8 is formed with an extension 16 provided with bores 17, 18 and 19 arranged in parallel spaced relation with respect to each other, the bore 18 being threaded. The bore 19 accommodates the outer tube 21 which is of a length to fit a substantial distance within the bore 19. The bore 17 is of a length to establish communication between the interior of the lower trap section 14 and tube 20. The tube 20 extends into the bore 17, while draw tube 22 has one of its threaded ends extended into the threaded bore 18. The bore 19 communicates with the interior of the upper trap section 8 through the upwardly inclined end portion 23 of the bore 19. The draw tube 22 communicates with the lower trap section 14 through the downwardly inclined end 18' of the bore 18.

The outer ends of the tubes 20 and 21 fit within openings of the disc 25, the tubes 20 and 21 being in communication through the annular groove 26 formed in the surface of the disc 25, so that smoke passing through the tube 21 may enter the tube 20 through the groove 26 from where the smoke passes into the lower trap section 14.

The tube 22 which is slightly longer than the tubes 20 and 21, has its threaded end 27 fitted in a central threaded opening of the nut 28 which is connected with the mouthpiece 29 during the moulding of the mouthpiece, and said nut 28 is drawn into such close relation with the disc 25 that the open side of the groove 26 is closed by the nut providing a smoke passageway.

When smoking the pipe, the smoke is drawn from the bowl 5 into the interior of the upper trap section 8 and passes into the bore 19 through the end portion 23 into tube 21. The smoke now passes into the groove 26 formed in the disc 25, from which the smoke enters tube 20 and passes through bore 17 into the annular passageway 15. The smoke now enters the bore 18', 18 of the trap section and passes through the draw tube 22, from which the filtered smoke passes into the mouthpiece 29.

From the foregoing it will be seen that I have provided a smoking pipe wherein the bowl of the pipe may be constructed of the usual material used in the manufacture of pipe bowls such as briarwood, in pipe bowl construction, and that the various tubes which connect the mouthpiece with the bowl, as well as the upper and lower trap sections of the pipe, may be constructed of metal, and that saliva and all moisture due to condensation caused by the heat of the smoke will be trapped, and the smoke entering the mouth of the smoker will be freed of objectionable moistures and saliva which may pass into the upper and lower trap sections during smoking.

It will also be noted that due to the construction shown and described, the pipe may be readily and easily dismantled and the various parts thoroughly cleaned.

I claim:

1. A tobacco smoking pipe comprising a bowl having an externally threaded bottom, an upper trap section threaded on said bottom, said bottom having a plurality of bores establishing communication between the bowl and upper trap section, through which smoke passes from the bowl, a lower trap section removably secured to the upper trap section providing a moisture trap between said trap sections, a plurality of tubes mounted in parallel spaced relation with respect to each other, embodying outer tubes, and an inner draw tube, one of said outer tubes being connected with the upper trap section and communicating therewith, the other outer tube communicating with the lower trap section, means for establishing communication between said outer tubes whereby smoke passes from one outer tube to the other outer tube, and said inner draw tube being in communication with the lower trap section through which smoke is drawn, and a mouthpiece connected with said draw tube.

2. A tobacco smoking pipe comprising a bowl having a bottom formed with a plurality of bores extending vertically therethrough, an upper moisture trap section having a bottom and having its side wall converging towards the bottom of said trap section, said upper moisture trap section being removably secured to the bottom of said bowl and communicating with said bowl through said bores, a lower trap section removably connected with the upper trap section and having its bottom disposed adjacent to the bottom of the upper trap section providing an annular passageway around said upper trap section, a plurality of tubes, one end of each tube being connected with the upper trap section, one of said tubes being in communication with the interior of the upper trap section, another tube communicating with said annular passageway in the lower trap section, means for establishing communication between the other ends of the latter tubes, providing a continuous passageway through said latter tubes, and one of said tubes providing a draw tube through which smoke passes from said lower trap section, and a mouthpiece to which said draw tube in connected.

3. A tobacco smoking pipe comprising a bowl having a bottom, an upper moisture trap section removably secured to the bottom of the bowl, said bowl having passageways establishing communication between the bowl and upper trap section, a lower trap section secured to said upper trap section, a plurality of tubes, one end of each tube being connected with the upper trap section, one of said tubes communicating with the interior of said upper trap section, another tube communicating with the interior of said lower trap section through which tube smoke is delivered to the interior of said lower trap section, one of said tubes communicating with said lower trap section embodying a draw tube, means for establishing communication between the other ends of certain of said tubes providing a continuous passageway, and a mouthpiece secured to said draw tube through which smoke passes from the pipe.

References Cited in the file of this patent

UNITED STATES PATENTS

| 675,594 | Flint | June 4, 1901 |
| 1,761,636 | Mancusi | June 3, 1930 |
| 1,939,473 | Torrese | Dec. 12, 1933 |
| 2,634,732 | Baxter | Apr. 14, 1953 |

FOREIGN PATENTS

| 1,011 | Great Britain | 1914 |